United States Patent [19]

Edwards

[11] 4,283,724

[45] Aug. 11, 1981

[54] VARIABLE SIZE DOT MATRIX CHARACTER GENERATOR IN WHICH A HEIGHT SIGNAL AND AN ASPECT RATIO SIGNAL ACTUATE THE SAME

[75] Inventor: Philip K. Edwards, Washington Grove, Md.

[73] Assignee: Computer Operations, Lanham, Md.

[21] Appl. No.: 16,299

[22] Filed: Feb. 28, 1979

[51] Int. Cl.[3] .............................................. G06F 3/14

[52] U.S. Cl. .................................. 340/731; 340/749; 340/790

[58] Field of Search ............... 340/790, 731, 749, 723, 340/748, 744

[56] References Cited

U.S. PATENT DOCUMENTS

| | | | |
|---|---|---|---|
| 3,614,767 | 10/1971 | Carrell | 340/749 |
| 3,675,232 | 7/1972 | Strout | 340/790 |
| 3,911,420 | 10/1975 | Lampson | 340/731 |
| 3,999,168 | 12/1976 | Findley et al. | 340/731 |
| 4,078,249 | 3/1978 | Lelke et al. | 340/731 |
| 4,168,489 | 9/1979 | Ervin | 340/731 |

*Primary Examiner*—Marshall M. Curtis

*Attorney, Agent, or Firm*—Lerner, David, Littenberg & Samuel

[57] ABSTRACT

A variable size and position character generator is described for use with a cathode ray tube raster scanning system to display characters as matrices of dots. The keyboard includes controls for permitting a user to select a particular height, aspect ratio and baseline for each character selected to be displayed. A unique character address signal is developed for each such selected character and serves to identify a unique, fixed size dot matrix for the selected character which is stored in a first read-only memory. A character converter, in the form of a second read-only memory, receives the selected height, aspect ratio and baseline information signals along with normal scan line counter signals and modifies the latter to develop scan control signals that are fed to the first read-only memory for controlling the height and position of the character selected to be displayed. The width of the character is also controlled by a dot rate selection signal developed in the character converter memory, which permits selection of one of a plurality of clock rates whose signals are then utilized to read out the contents of a parallel-to serial shift register that stores the individual dot signals for a given scan line segment.

30 Claims, 7 Drawing Figures

VARIABLE SIZE DOT MATRIX CHARACTER GENERATOR IN WHICH A HEIGHT SIGNAL AND AN ASPECT RATIO SIGNAL ACTUATE THE SAME

BACKGROUND OF THE INVENTION

1. Field of the Invention

The present invention is related to character generating sytems and, more particularly, is directed towards a character generator of the raster scan type which displays a selected character as a dot matrix, and means for varying the size and position of the selected character.

2. Description of the Prior Art

A conventional character generator employed both in television broadcasting and in video terminals digitally generates characters for display by utilizing a read-only memory (ROM) which permanently stores the dot pattern or matrix for each character of a predetermined set of characters or symbols. For example, ROM integrated circuit chips are available which store a set of sixty-four characters, each character consisting of a 5×7 dot matrix. Other somewhat higher resolution ROM dot pattern matrices include 7×9 dots and 7×11 dots. For high resolution, such as is required in broadcast television, a ROM character generator having a 32×32 dot pattern matrix for each character may be utilized.

A standard technique for generating visually observable signals manifesting the characters stored in a ROM is to address simultaneously the ROM by a first multibit character code, such as the well-known ASCII code, and a second multibit scan line code. The character code defines the particular one of the set of characters to be read out from the ROM, while the scan line code defines the particular consecutive scan line of the character then being scanned. In response to these two multibit codes, the ROM loads the various stages of a shift register with the pattern of dot signals that correspond to the particular character and scan line then being read out. This loading of the shift register occurs at the onset of each charactor display interval. Subsequently during the same interval, the pattern of dot signals is shifted out serially by a dot clock to produce the digital video. It may be appreciated, therefore, that the shift register serves as a parallel-to-serial converter. The video signal output from the shift register, after being combined with suitable sync and blanking signals, may then be employed either directly, e.g. in a video terminal, or indirectly, e.g. in television broadcasting, as an intensity-modulating Z-axis signal of a television cathode ray tube.

The size and shape of the set of characters stored in such a ROM character generator is, by its very nature, fixed and permanent. The baseline position of the displayed characters on the screen is also generally predetermined.

From a user's point of view, it would be highly desirable to have the capability of generating high resolution characters from a fixed ROM set of characters which may be selectively varied in height, width and position relative to other characters on the screen. It would further be highly desirable if such size varying capabilities were available on a character-by-character basis. It is towards achieving these objectives that the present invention is advanced.

I am aware of several prior art techniques and systems which have been utilized to vary character size in a read-only memory character generator.

For example, the Model D-3000 television character generator manufactured by Datavision Video Products of Gaithersburg, Md., employs a shift key on the keyboard which serves to select either a large character typing mode or a small character typing mode. The output signal developed by this shift key is fed on a single bit line as a character size signal to an auxiliary read-only memory which also receives as inputs the scan line code. The outputs of this auxiliary ROM consist of scan line signals which have been modified depending upon the single character size bit of information. The modified scan line signals are then delivered to the fixed size character ROM set and serve to select one of two modes for reading out the lines of dot signals. This technique, therefore, permits a user to select one of two different heights for the character selected to be displayed. While an improvement over the prior art, this system is limited in versatility in that only one character height different from normal full height can be selected. Further, the characters are all of constant width, regardless of the height selected, and all characters are located on an invariable baseline.

I am also aware of U.S. Pat. No. 3,754,229 which provides proportional spacing of the characters on the screen by controllably varying the speed at which the dot signals are generated during uniform scans of the screen. While being an improvement over the constant width character generators of the prior art, the system described in this patent also lacks versatility in that the width for each character is predetermined. That is, while some characters may be wider than others, no means are provided for permitting the user to select a particular width desired for a particular character. Further, the system described in this patent does not provide for any height or baseline variation.

Other United States patents in the character generation art of which I am aware include: U.S. Pat. Nos. 3,659,283; 3,816,823; 3,893,100; 3,928,845; 4,053,878; 4,081,799; 4,090,188; 4,107,662; 4,107,665; 4,107,786; 4,119,954; 4,121,228; and 4,129,859. Several of the patents, such as U.S. Pat. Nos. 4,081,799 and 4,090,188, are primarily involved with increasing the size of the generated characters for increasing resolution, and employ complex algorithms for achieving this result. Such systems are of extremely limited usefulness and versatility vis-a-vis a truly variable height, width and position character generator.

The aspect ratio of a displayed character, defined as the ratio of its width to its height, is frequently of more significance to the user of a video character generator than height or width information by itself. That is, a printer or operator may feel more comfortable specifying the desired size of a character by specifying its aspect ratio and either its height or width than by simply specifying the height and width separately. This is due to the common practice in the printing art of specifying the size of a character font by its aspect ratio and height or width. It can therefore further be appreciated that it would be highly desirable if inputs to a keyboard for a character display system of the type discussed above could be provided which permitted a user to specify character size by simply specifying a selected height or width and a desired aspect ratio for the character, rather than selecting the height and width independently. It is also toward achieving this object that the present invention is advanced.

OBJECTS AND SUMMARY OF THE INVENTION

It is therefore a primary object of the present invention to provide a variable size character generator for use in a raster scan system that displays characters as matrices of dots, and which is more versatile than systems heretofore available while overcoming their disadvantages as noted above.

Another object of the present invention is to provide a method and apparatus for permitting the displayed size of a selected character in a dot matrix raster scan character generator system to be varied with respect to its height, width and position on the display.

A further object of the present invention is to provide a system for permitting a user of a raster scan dot matrix character generator system to select the height, width and baseline of each character selected on the system's keyboard, as the individual character selections are being made.

An additional object of the present invention is to provide, in a raster scan dot matrix character generator system, means for permitting the user to designate the height and aspect ratio of each selected character desired to be displayed.

A still further object of the present invention is to provide apparatus for varying the size and position of each selected character in a dot matrix character generator system which utilizes a fixed size dot matrix read-only memory for storing the dot patterns of the set of characters desired to be displayed.

Another object of the present invention is to provide a method and apparatus for use in a dot matrix character generating system which has the capability of displaying variable size characters from a fixed size dot matrix memory, and which permits such variable sized characters to be selectively vertically positioned on the display medium in a manner which permits either top or bottom truncation of the displayed character.

The foregoing and other objects are achieved in accordance with one aspect of the present invention through the provision of a variable size character generator for use in a system that displays characters as matrices of dots. The system includes a record medium, a modulated beam which impinges on the record medium, and means for generating a scanning raster so that the modulated beam is repetitively swept across the record medium at a substantially uniform rate. The variable size character generator more particularly comprises means for generating control signals for each character selected to be displayed. The control signals include a character address signal defining the selected character, a height signal defining a selected height for the selected character, and an aspect ratio signal defining a selected aspect ratio for the selected character. Means are also provided for modulating the beam in accordance with the control signals for causing the selected character having its selected height and selected aspect ratio to be displayed on the record medium.

The modulating means more particularly comprises means for generating scan control signals for the selected character in accordance with the height signal and the aspect ratio signal, and dot matrix memory means for storing each of the characters as a dot matrix at a preselected character address. Each dot matrix has a fixed number of lines, and each of such lines have predetermined dot signals which are read out from the dot matrix memory in response to the character address signal and the scan control signals.

In accordance with a further aspect of the present invention, the means for modulating the beam further includes means for generating a dot rate selection signal for the selected character in accordance with the height signal and the aspect ratio signal, means for generating a clocking signal whose frequency is selected in accordance with the dot rate selection signal, and means for storing the dot signals and for reading the same out serially in accordance with the frequency of the clocking signal.

In accordance with another aspect of the present invention, the control signals may further include a bottom line signal defining a selected bottom line for each row of characters, the bottom line signal being provided to the means for modulating for defining a reference line for each of the selected characters on such row. The control signals may further include a baseline signal defining a selected baseline for each selected character, the baseline signal being provided to the modulating means for causing the selected character having its selected height and its selected aspect ratio to be displayed on the record medium in a position according to the baseline signal. The bottom line signal and baseline signal are also received and taken into account by the means for generating scan control signals for the selected character.

The control signals are received and stored asynchronously in a random access memory which is being continuously interrogated by a width counter signal and a segment height counter signal for outputting onto an address bus a character address signal specified by the selected character and for outputting onto a character converter bus a height signal specified by the selected height and an aspect ratio signal specified by the selected aspect ratio. Means are provided for generating scan line counter signals for counting scan lines up to a predetermined height. Further, the means for generating scan control signals comprises character conversion means, preferably in the form of a read-only memory, which is responsive to the scan line counter signals, the height signal and the aspect ratio signal for providing the scan line control signals to the dot matrix memory.

In accordance with another aspect of the present invention, in a system for displaying characters as matrices of dots on a record medium, there is provided a method for varying the display size of a selected character, which comprises the steps of setting a selected height of the display size in response to a height signal, and setting a selected width of the display size in response to an aspect ratio signal.

More particularly, the step of setting a selected height includes the steps of generating the height signal and the aspect ratio signal in accordance with a selected height user command and a selected aspect ratio user command, respectively, generating scan control signals in accordance with the height signal and the aspect ratio signal, and reading out line dot signals of a fixed dot matrix of the selected character from a preselected character address of storage means in accordance with the scan control signals.

The step of setting a selected width more particularly includes the steps of generating a dot rate selection signal for the selected character in accordance with the height signal and the aspect ratio signal, generating a clocking signal whose frequency is selected in response to the dot rate selection signal, and storing the line dot signals and reading same out serially in accordance with the frequency of the clocking signal.

BRIEF DESCRIPTION OF THE DRAWINGS

Various objects, features and attendant advantages of the present invention will be more fully appreciated as the same becomes better understood from the following detailed description of the present invention considered in connection with the accompanying drawings, in which.

DETAILED DESCRIPTION OF THE PREFERRED EMBODIMENT

Figure 1:
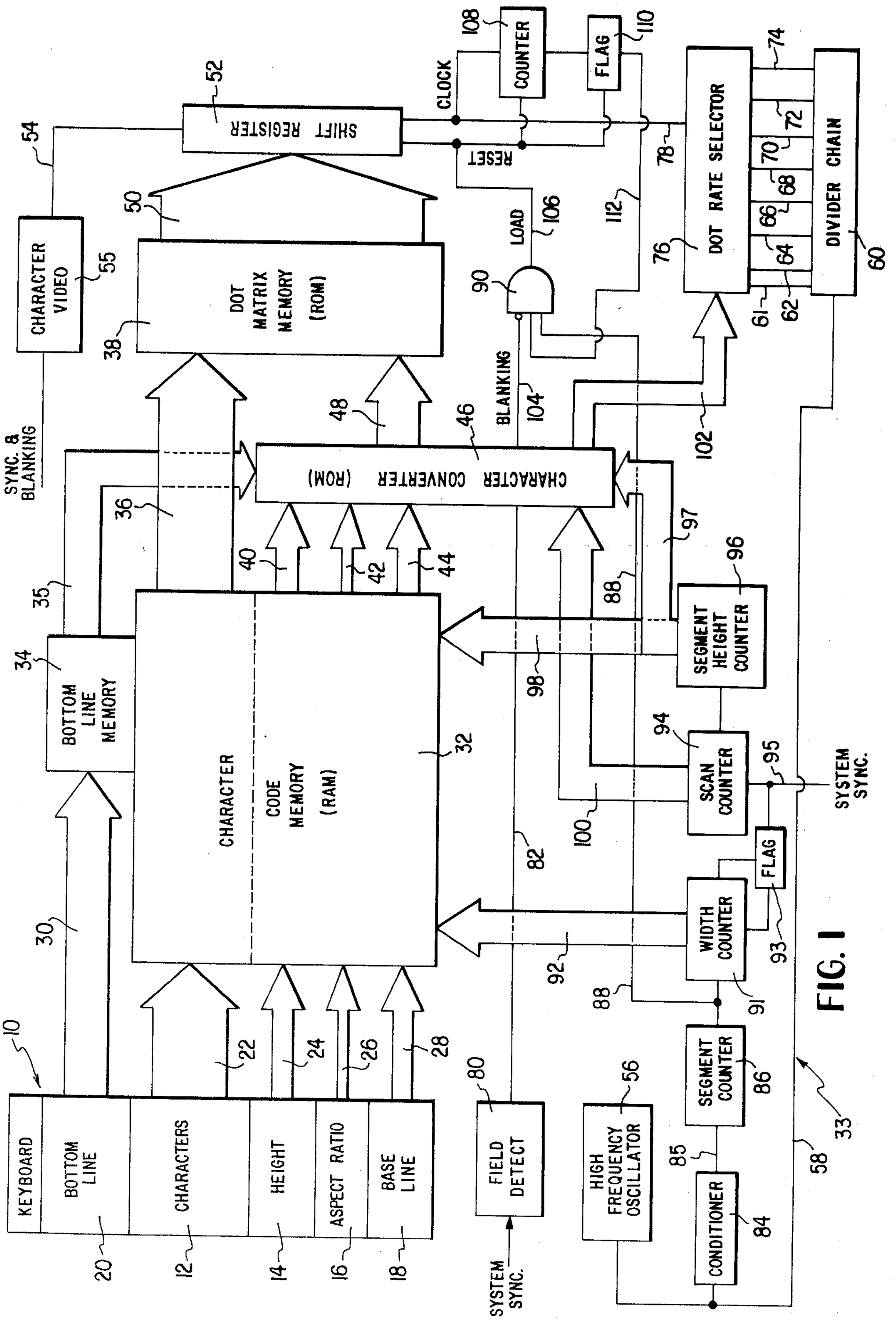
FIG. 1 is a block diagram of a preferred embodiment of the variable size character generator of the present invention.

Referring first to FIG. 1, there is illustrated an overall block diagram of a preferred embodiment of a variable size character generator in accordance with the present invention. The system includes a dot matrix memory 38 which may comprise a conventional read-only memory (ROM) for storing data representing a plurality of fixed size dot matrices each representing one of a set of characters displayable on a character video output screen 55.

In the preferred embodiment, selected for the purposes of illustration, dot matrix memory 38 contains 256 addresses, at each of which is stored data representing a fixed 32×32 dot matrix. The individual dot matrices are addressed by an 8-bit code signal, similar to, for example, the ASCII code, which is inputted to the dot matrix memory 38 by an 8-bit character address data bus 36 thereby selecting the particular one of the set of characters in the dot matrix memory 38 to be read out.

Dot matrix memory 38 is also addressed by a multibit scan line control code signal which is input to the dot matrix memory 38 by a 5-bit scan line data bus 48. The 5-bit scan control signal on bus 48 defines the particular one of a given number of raster scan lines occupied by a row of characters then being scanned. Each dot matrix stored in memory 38 has a fixed number of lines (32 in the example), each having a predetermined sequence of dot signals associated therewith.

As is conventional, the output from dot matrix memory 38 is along a parallel 32-bit bus 50 and consists of a single line of a character's dot matrix signals as selected by the signal on the 5-bit scan line data bus 48.

The present invention, in one aspect, involves varying and controlling the sequence of scan line control signals on data bus 48 to permit selective control of the order of read out of a selected character's line dot signals, in a manner to be described in greater detail hereinafter.

The 32-bit output on bus 50 from the dot matrix memory 38, upon an appropriate command, is loaded into a multi-stage shift register 52 at the onset of each character display interval. During this interval, the dot signals stored in shift register 52 are shifted out serially along line 54 in response to a dot clocking signal delivered via line 78. The shift register 52 therefore serves as a parallel-to-serial converter. The video signal output along line 54 from the shift register 52 is employed as an intensity modulating signal of the cathode ray tube of a character video display monitor 55 or similar record medium.

The present invention, in another aspect, provides one of a plurality of dot clocking signals along line 78 to shift register 52, which varies the rate at which the line dot signals are displayed on character video terminal 55 to thereby permit variation of the width of the displayed character, in a manner to be described in greater detail hereinafter.

The character generator of FIG. 1 includes a user command input terminal in the form of a keyboard which is indicated generally by reference numeral 10. The keyboard 10 includes a plurality of character keys 12 for permitting a user to select a particular character for display. The keyboard 10, in response to selection of a particular character by activation of a character key 12, generates a multibit symbol code along address bus 22. In the preferred embodiment, the character address signal on bus 22 comprises an 8-bit code similar to the ASCII code. This 8-bit code therefore identifies one of 256 distinct characters.

As is conventional, the character address signal on bus 22 is asynchronously loaded into a location in a character code or refresh memory 32 which conventionally comprises a random access memory (RAM). Each 8-bit code from bus 22 is conventionally loaded in a location in RAM 32 that corresponds to a predetermined position on video output 55. In the exemplary embodiment, there are 64 such locations in memory 32 per scan line of the video output monitor 55.

The present invention permits selection of character size and position information by generating, in addition to the normal 8-bit character address signal on bus 22, appropriate control signals that are also fed to the random access memory 32. To this end, keyboard 10 includes a height selection switch 14 which allows a user to select one height from among a plurality of predefined heights at which the selected character is desired to be displayed. For example, one of five different heights may be selected via height switch 14. Each of the five different heights are defined by a unique number of scan lines over which the selected character is to be displayed. Selection of a particular one of the five heights generates a 3-bit height signal along bus 24 which may also be asynchronously input to the same location in random access memory 32 where the character address signal is stored. Obviously, the 3-bit data bus 24 may accommodate a selection of up to eight different heights, if desired. The exemplary embodiment described herein employes five heights for ease in explanation.

In addition to height information, the present invention permits selection of one of a plurality of different aspect ratios via aspect ratio switch 16 on keyboard 10. Selection of an aspect ratio, defined as the ratio of a character's width to its height, develops an aspect ratio signal along bus 26. This signal may also be inputted asynchronously to the same location in random access memory 32 at which is stored the corresponding selected character address signal and height signal. In the exemplary embodiment, a 2-bit bus 26 is provided which permits selection of one of four different aspect ratios for the selected character desired to be displayed.

It may be appreciated that selection of a particular height and a particular aspect ratio uniquely defines the width of the selected character, and both the 3-bit height signal and the 2-bit aspect ratio signal are utilized to develop signals for controlling the width, in a manner to be described in greater detail hereinafter.

The present invention, in addition to providing means for varying the height and aspect ratio of a selected character, also permits the position of the selected character to be varied on a display line-by-display line and character-by-character basis. To this end, the keyboard 10 is provided with a baseline selection switch 18 and a bottom line selection switch 20 which respectively develop a baseline signal on output bus 28 and a bottom line signal on output bus 30. The baseline signal on bus 28, which in the example preferably comprises a 3-bit bus to permit selection of one of eight different baselines, may also be stored in the same location in random access memory 32 as the character address signal from bus 22. The baseline signal defines a unique baseline for each selected character.

The bottom line signal on bus 30 defines a bottom line for each row of characters that serves as a reference line from which the baseline for a particular selected character may be varied. A user must decide in advance what size the largest character on a particular display line will be, and the bottom line input 20, which may be in the form of a blinking light cursor, may then select the lowest bottom line necessary to define same for that particular row of characters. The number of lines in bottom line signal bus 30 must be equal to the number of binary bits required to identify the total number of segments in the selected field. For the present example, the minimum size of the basic character building block is called a segment and is defined as an 8×8 dot field. Since, in the chosen example, there are 24 potential 8-line segments in the active display area, a 5-bit line is required for the bottom line signal bus 30. Further, since there is only a single bottom line signal for each segment line, only 24 addresses need be provided in the bottom line memory 34 for storing the bottom line signals. Bottom line memory 34 is randomly accessible by means of a bus 98 from a segment height counter 96 to read out synchronously the bottom line signals via output bus 35 at the segment height rate, as will be described in greater detail hereinafter.

In summary, the randomly accessible character code memory 32 contains one address location for each 16-bit code received along buses 22, 24, 26 and 28. The character code memory 32 and bottom line memory 34 are continuously refreshed via buses 92 and 98 to deliver the 5-bit bottom line signal on output bus 35, the 8-bit character address signal on output bus 36, the 3-bit height signal on output bus 40, the 2-bit aspect ratio signal on output bus 42, and the 3-bit baseline signal on output bus 44. The signals on buses 35, 36, 40, 42 and 44 are synchronously output from memories 32 and 34 at a constant rate of, for example, 1.25 MHz.

The refresh signals on buses 92 and 98 are respectively developed by a width counter 91 and a segment height counter 96 which form part of a master oscillator control circuit which is indicated generally by reference numeral 33. Assume in the chosen example that there are a maximum of 64 characters per display line, and each of the characters has a nominal width of 32 dots, and further that the basic character building block size or segment is 8×8. The master clock 56 is then chosen to provide a high frequency signal of 160 MHz. This signal is frequency divided by two in a conditioner 84 to develop a signal on line 85 of 80 MHz. This 80 MHz signal is fed into a segment counter 86 which comprises a divide-by-64 circuit to provide on its output line 88 a signal of 1.25 MHz which is the segment rate, there being 64 such segments per scan line, each segment including 32 dot signals. The output line 88 from segment counter 86 feeds the 1.25 MHz signal as one input to a load control gate 90 which, upon receipt of additional signals, serves to load the shift register 52 in a manner to be described in greater detail hereinafter.

The 1.25 MHz signal from segment counter 86 is also fed to a width counter 91 which, for the example being described, comprises a divide-by-64 circuit. The width counter 91 counts to sixty-four along its 6-bit output bus 92 at a frequency equal to the scan rate. Bus 92 sequentially accesses each address location in RAM 32 on an individual scan line (defined by a segment height counter 96) to deliver the 16-bit control signals to output buses 36, 40, 42 and 44.

Although normally a line is scanned in 63.5 microseconds, only about 50 microseconds of that time may be utilized to display characters. Thus, after 64 pulses are counted by width counter 91 at a 1.25 MHz rate, a flag 93 is set to prevent the counter 91 from restarting until a sync pulse is received from the external system sync to indicate that the full 63.5 microseconds has elapsed. Upon reset, flag 93 restarts counter 91 to resume its refresh action for the next set of 8-line segments in RAM 32.

The system sync signal at 15.75 MHz (the nominal scan line rate) is fed via line 95 into a scan counter 94 which, for the given example, comprises a divide-by-8 circuit. The output of the scan counter is delivered to a 3-bit output bus 100 which repetitively counts to eight to thereby provide a scan line counter signal. The frequency divided output from scan counter 94 is also fed into a segment height counter 96 which, for the given example, also comprises a divide-by-8 circuit. Segment height counter delivers a 3-bit segment height counter signal along buses 97 and 98 which count eight 8-line segment heights, for a total of sixty-four possible scan lines. Buses 100 and 97 respectively feed scan line counter signals and segment height counter signals to a character converter 46, for a purpose which will now be described.

In order to control, or in a broader sense modulate, the information in the dot matrix memory 38 in accordance with the generated height, aspect ratio, baseline and bottom line signals, the present invention provides the character converter 46 in the preferred form of a read-only memory (ROM) which receives the selected character size and position information via data buses 40, 42, 44 and 35 and alters the scan line and segment height counter signals received on buses 100 and 97 to provide the necessary sequence of scan control signals along bus 48 to dot matrix memory 38 for controlling the height and position of the selected character, and also develops a dot rate selection signal along data bus 102 for controlling the width of the selected character.

In other words, with respect to height, the ROM 46 interrupts the segment height and scan line counter signals from buses 97 and 100 and modifies same in accordance with the height, baseline and bottom line information received from buses 40, 44 and 35. The modified scan line control signals are output via the 5-bit data bus 48 which manipulates the read out sequence of line dot signals for the character selected by data bus 36 in dot matrix memory 38. The ROM 46, in this regard, may either delete certain of the 32 fixed dot lines per character to make a lower height character, or may repeat any of a number of fixed dot lines per character to make a larger height character. By properly configuring the contents of the character converter ROM 46, the fixed 32 scan line matrix height of each character in dot matrix memory 38 can be contracted to as low as eight lines in height, or can be expanded, in the given example, up to 64 lines in height.

Character converter ROM 46, also being provided with bottom line information via data bus 35 and baseline information via data bus 44 thereby knows and can select which part of the general 32×32 reserve space is to be written in and which part is to be blank, thereby providing a highly versatile vertical positioning and sizing capability.

Since the character converter ROM 46 possesses both height and width information by means of the height signal on bus 40 and the aspect ratio signal on bus 42, it can develop along output bus 102 a dot rate selection signal which, in the example given, can consist of one of eight dot rate selection signals that is fed to a dot rate selector 76 which may comprise, for example, a gating circuit.

Gating circuit 76 serves to select, in response to the dot rate selection signal on bus 102, a particular clock frequency appearing on one of a plurality of outputs 61, 62, 64, 66, 68, 70, 72 and 74 from an oscillator divider chain 60. The latter circuit divides the master clock output signal on line 58 from the high frequency oscillator 56 into a plurality of oscillator frequencies which are predetermined in accordance with the selected aspect ratios.

The dot rate selector 76 therefore gates one of the oscillator signals on lines 61–74 to its output line 78 as a clocking signal to the parallel-to-serial shift register 52. It may be appreciated that the higher the rate of the clocking signal along line 78, the faster the dot signals stored in shift register 52 will be output to line 54, thereby providing a relatively narrow character on display 55. A lower speed oscillator will provide a slower clocking signal along line 78 to dump the contents of shift register 52 at a slower rate, thereby providing a wider character for display on video output 55.

The loading of the shift register 52 is controlled by a loading gate 90 which outputs a load signal on line 106 to shift register 52 only upon the presence of a segment divider signal along line 88, which indicates the end of a 32 dot segment, and a clock count output signal on line 112. The clock count output signal is developed by a 32-bit counter 108 which, after counting 32 clock pulses along line 78, activates a flag 110, e.g. a flip-flop, to provide the clock count output signal on line 112. The counter 108 and flag 110 are provided to ensure that the shift register 52 cannot be reloaded while the previous contents thereof are still being read out, regardless of the speed of the clocking signal along line 78. This ensures that dot signals of extremely wide characters will not be overlapped by the next 32 dot signals until they have been entirely read out from shift register 52. The segment divider signal on line 88, it will be recalled, delivers 64 pulses at the 1.25 MHz scan line rate to enable gate 90 at the end of every 32 dot segment, of which there are 64 on each scan line.

A third input to load gate 90 is line 104 which provides a blanking input. Using positive logic for the example, line 104 is normally low when loading of information to the shift register is desired. Line 104 goes high to disable gate 90 for blanking above or below a character if it does not fill the entire segment or row space as defined by the bottom line signal 35. It is noted that the bit information on line 104 is, in the given example, inverted prior to entering gate 90, but it is clear that negative logic could be employed, if desired.

Finally, the character converter ROM 46 is also provided with a field detect signal along line 82 from a field detector circuit 80 which receives system sync pulses. This requirement arises from the interlace characteristics of a raster scan, and the information on line 82 simply tells the ROM 46 if the system is in the odd field (consisting of 263 lines) or the even field (consisting of 262 lines).

EXAMPLES

The following examples are presented to demonstrate the versatility of the present invention in enabling selection of a desired height, aspect ratio, baseline and bottom line for a selected character. Six examples are presented, the resultant displays being illustrated respectively in FIGS. 2 through 7. It will be assumed, consistent with the above-described exemplary embodiment, that the dot matrix memory 38 stores a plurality of fixed size character dot matrices, each matrix being 32 scan lines high and 32 dot signals wide, and that the high frequency oscillator 56 develops a master clock signal of 160 MHz.

As a point of reference, a "normal" aspect ratio of 3:4 is selected to provide what will be referred to as a "bold" character. As utilized in the following discussion, the "nominal rate" for each selected height is defined as that oscillator rate which provides a "bold" character for the selected height.

TABLE 1 below sets forth the nominal oscillator rates for each of five possible heights which may be input on keyboard 10 for each selected character. Each height, specified as a number of scan lines, has a unique nominal rate associated therewith to provide a "normal" aspect ratio for the displayed character of 3:4. It will be understood that a greater or lesser number of heights may be selected, and the five heights shown below are purely exemplary.

TABLE 1

| Height Control Signal | Height (Scan Lines) | Nominal Rate (MHz) |
|---|---|---|
| 000 | 16 | 40.0 |
| 001 | 24 | 26.6 |
| 010 | 32 | 20.0 |
| 011 | 48 | 13.3 |
| 100 | 64 | 10.0 |

TABLE 2 below shows four different aspect ratios which may be selected on keyboard 10 for each selected character. It is noted that binary control signal "01" will specify a "normal" aspect ratio which calls for the nominal dot signal rate for the particular height selected. Aspect ratio binary control signal "00" will specify a "condensed" aspect ratio of 2.2:4 that will require the dot signals for that selected character to be output one step faster than the nominal rate for the selected height. This will provide a narrower character than normal. Similarly, aspect ratio binary control signal "10" will specify a "bold extended" aspect ratio of 4.4:4, which will require the dot signals for the selected character to be read out one step slower than the nominal rate for the selected height. This will result in a wider than normal character being displayed. In a similar manner, the aspect ratio binary control signal "11" specifies a "very condensed" aspect ratio of 1.4:4, which will require the dot signals to be output from the shift register at a rate which is two levels faster than the nominal rate for the selected height. This aspect ration results in a very narrow character display.

TABLE 2

| Aspect Ratio Control Signal | Aspect Ratio (W:H) | Rate |
|---|---|---|
| 00 | Condensed (2.2:4) | One step faster than Nominal Rate |
| 01 | Bold (3:4) | Nominal Rate |
| 10 | Bold Extended (4.4:4) | One step slower than Nominal Rate |
| 11 | Very Condensed (1.4:4) | Two steps faster than Nominal Rate |

TABLE 3 below indicates the clock frequencies required on the output lines 61 through 74 of the oscillator divider chain 60 in order to produce a selected character width given a particular height and aspect ratio in accordance with TABLES 1 and 2. Note that it is necessary that line 61 in FIG. 1 be available to provide an 80 MHz dot rate signal in the event that a 16 scan line height is selected with an aspect ratio of 1.4:4 (very condensed). The slowest dot rate signal of 6.6 MHz on line 74 must be available in the event that a sixty-four scan line height is selected for a character with a 4.4:4 aspect ratio (bold extended).

TABLE 3

| Dot Rate Selector Signal | Line | (Approximate) Frequency (MHz) |
|---|---|---|
| 000 | 61 | 80.0 |
| 001 | 62 | 53.3 |
| 010 | 64 | 40.0 |
| 011 | 66 | 26.6 |
| 100 | 68 | 20.0 |
| 101 | 70 | 13.3 |
| 110 | 72 | 10.0 |
| 111 | 74 | 6.6 |

EXAMPLE 1

Figure 2:
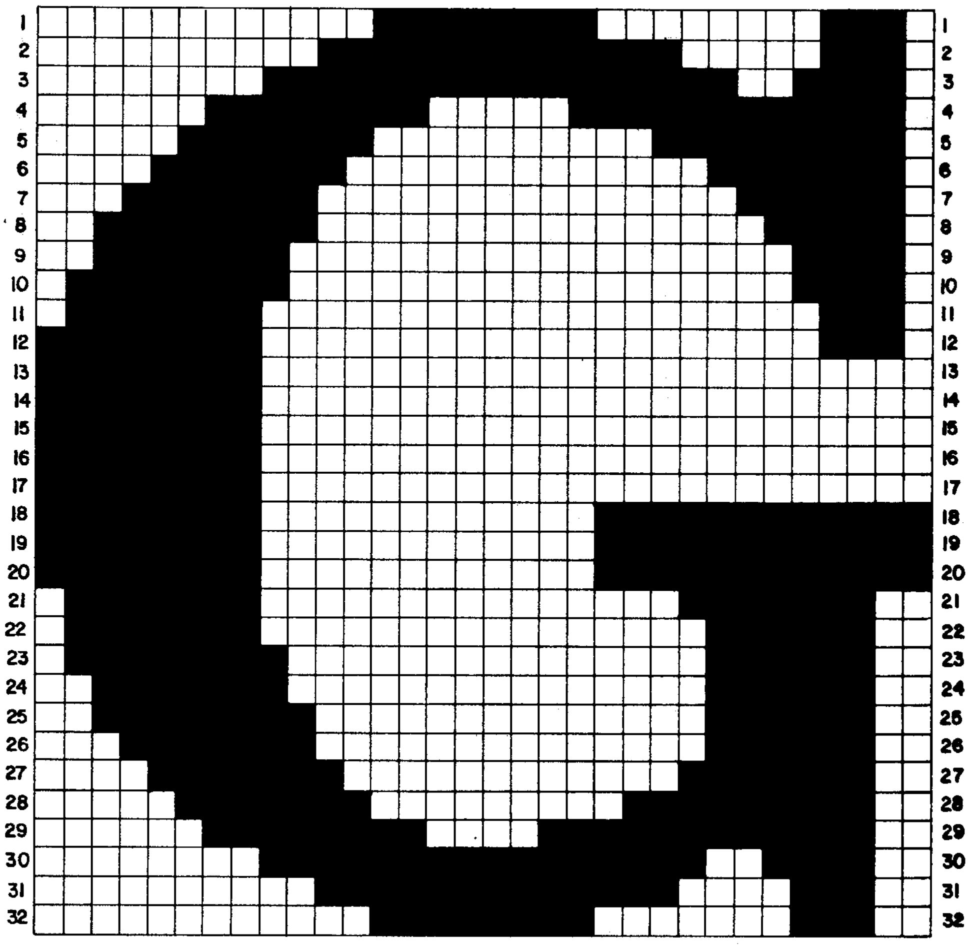
FIGS. 2 through 7 illustrate examples of the display sizes of a character which may be generated with the apparatus of FIG. 1.

Referring now to FIG. 2, there is illustrated a character display for the letter "G" for which the user has specified a 32 scan line height character having a "bold" aspect ratio (3:4). Both the baseline and bottom line are specified as line 32, and the resultant display is a "normal" character. On the left hand side of the grid of FIG. 2 appear the scan line and segment height counter signals input to the character converter ROM 46, while along the right hand side of the grid appear the scan control signals output along bus 48 from ROM 46. As can be appreciated, there is a one-to-one correspondence between the scan line and segment height counter signals and the scan control signals in this particular example, so that the height of the character of FIG. 2 is defined by all of the fixed dot signal scan lines stored in the dot matrix memory 38.

EXAMPLE 2

Figure 3:
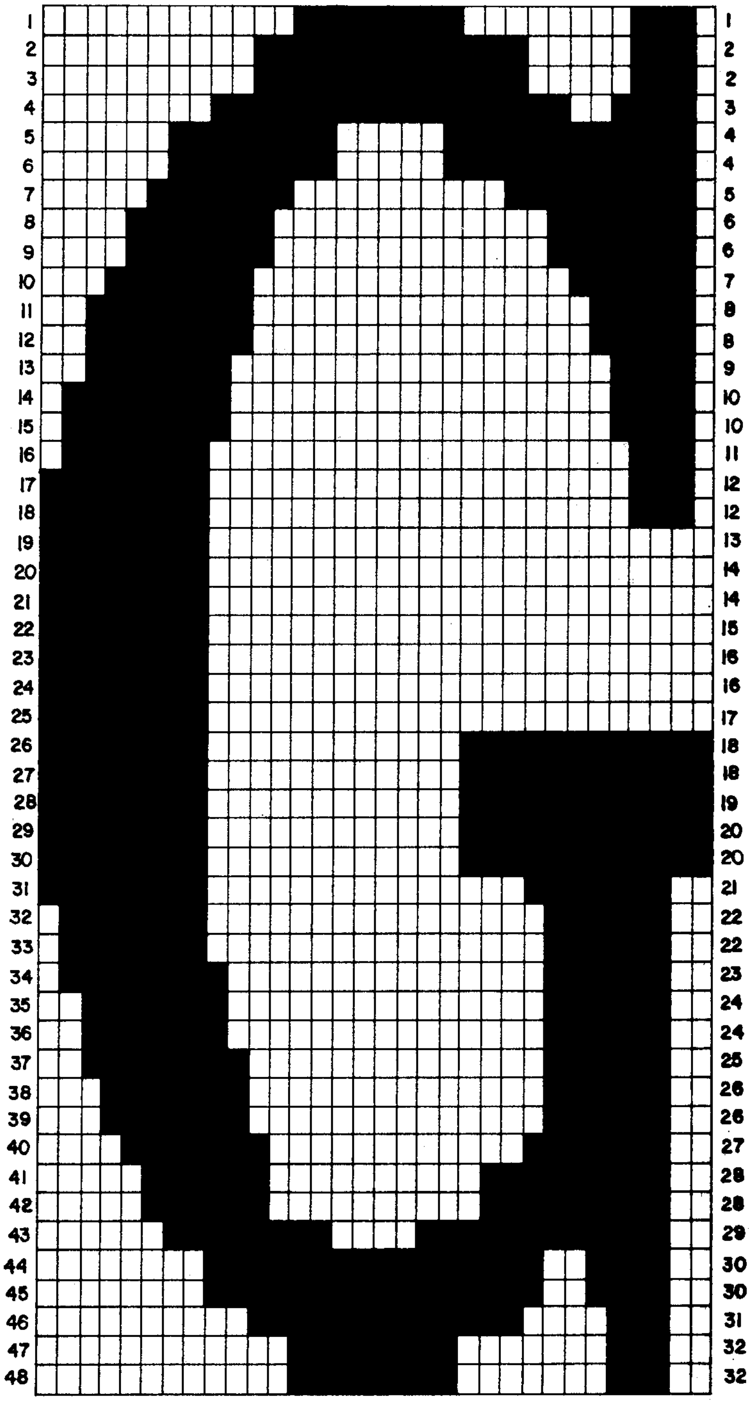

FIG. 3 illustrates the "G" character displayed when a 48 scan line height is specified on keyboard 10, an aspect ratio of 1.4:4 is selected (very condensed), and a baseline and bottom line of 48 are both specified. The dot rate selection signal output from the character converter ROM 46 for this example would be "011" to provide a clocking signal of 26.6 MHz, thereby providing a very narrow character of forty-eight scan lines in height. As with Example 1, the numbers to the left of the grid in FIG. 3 represent the scan line and segment height counter signals input to the ROM 46, while the numbers on the right hand side of the grid indicate the corresponding numbers sequentially output along scan control signal line 48.

As may be appreciated from comparing FIGS. 2 and 3, for the latter figure, several of the stored dot line signals in the dot matrix memory 38 were repeated to form the character having the selected height.

EXAMPLE 3

Figure 4:
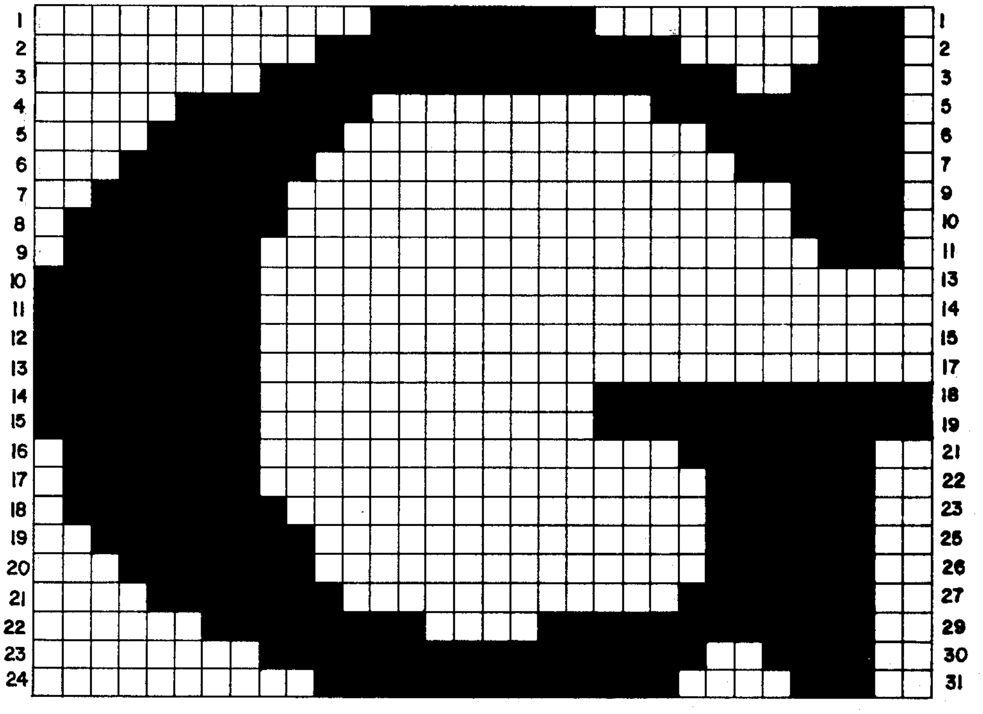

FIG. 4 illustrates the displayed character "G", derived from the same fixed size dot matrix in ROM 38 as the characters of FIGS. 2 and 3. In FIG. 4, a height of 24 scan lines is selected on the keyboard, and an aspect ratio of 4.4:4 is also specified. A baseline and bottom line of 24 were also selected for this example. The dot rate selection signal output by ROM 46 for this example is "100" representing a 20 MHz clocking signal. This provides a character having the same width as that of FIG. 2, but which is only 24 scan lines high. As with the preceeding examples, the input and output scan line signals to and from ROM 46 are shown on the left and right sides of the grid. In this case, several of the original dot signal lines were omitted to provide a shorter character.

EXAMPLE 4

Figure 5:
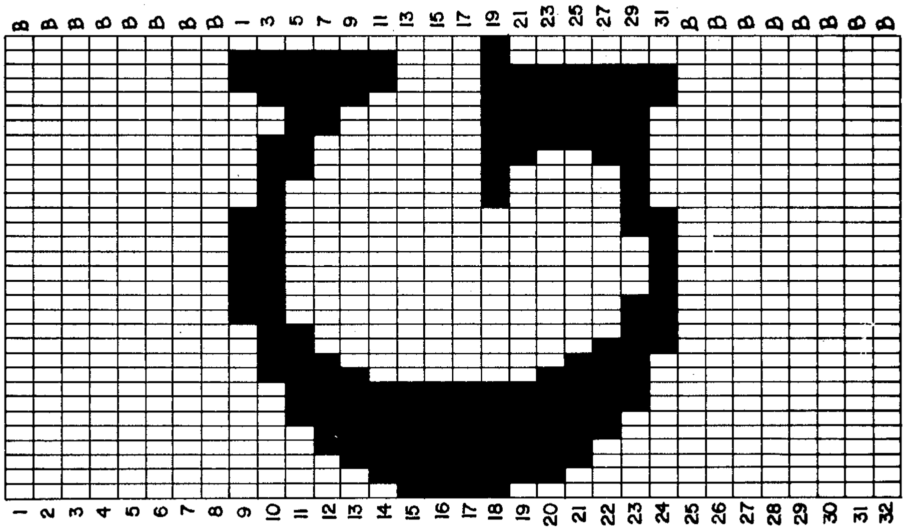

FIG. 5 illustrates the displayed character "G" when a 16 scan line height is selected, an aspect ratio of 3:4 (bold) is selected, a baseline of 24 is selected, and a bottom line of 32 is selected. In this example, due to selection of a different baseline and bottom line, the vertical position of the character is shifted to the approximate midportion of the 32 line display field. Therefore, for scan line and segment height counter signal inputs 1 through 8 and 25 through 32, the character converter ROM 46 provides a blanking signal along line 104 to gate 90 to prevent the shift register 52 from being loaded. The blanking lines are indicated in FIG. 5 by the letter "B" on the right hand side of the grid.

Note also with this example that although the clocking signal is much faster than the other example (thereby providing a more narrow character), since the aspect ratio is "normal", the displayed character simply appears to be a reduced scale version of the full size character illustrated in FIG. 2. That is, the aspect ratios of the characters of FIGS. 2 and 5 are identical.

EXAMPLE 5

Figure 6:
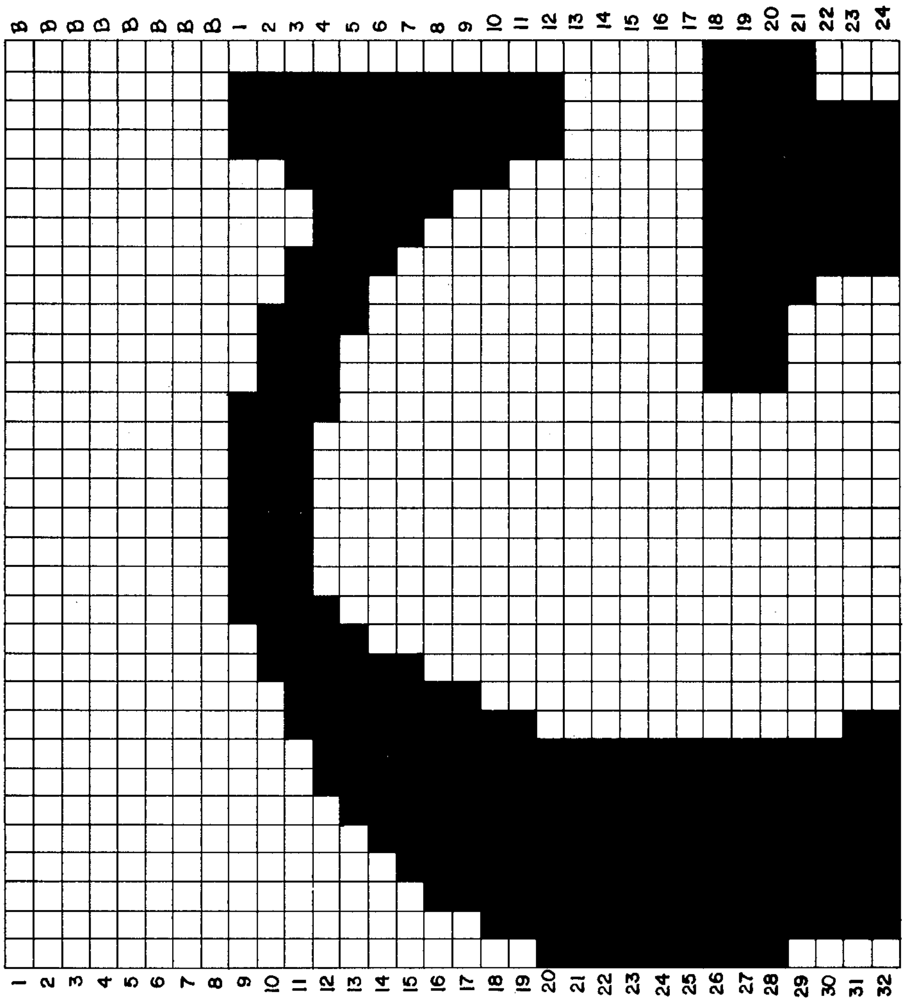

FIG. 6 illustrates a bottom cropped or truncated "G" which can be specified on keyboard 10 by selection of a 32 scan line height, a bold aspect ratio (3:4), a baseline of 40, and a bottom line of 32. For this example, the first eight scan line counter signals on line 100 produce blanking pulses on line 104 through ROM 46.

EXAMPLE 6

Figure 7:
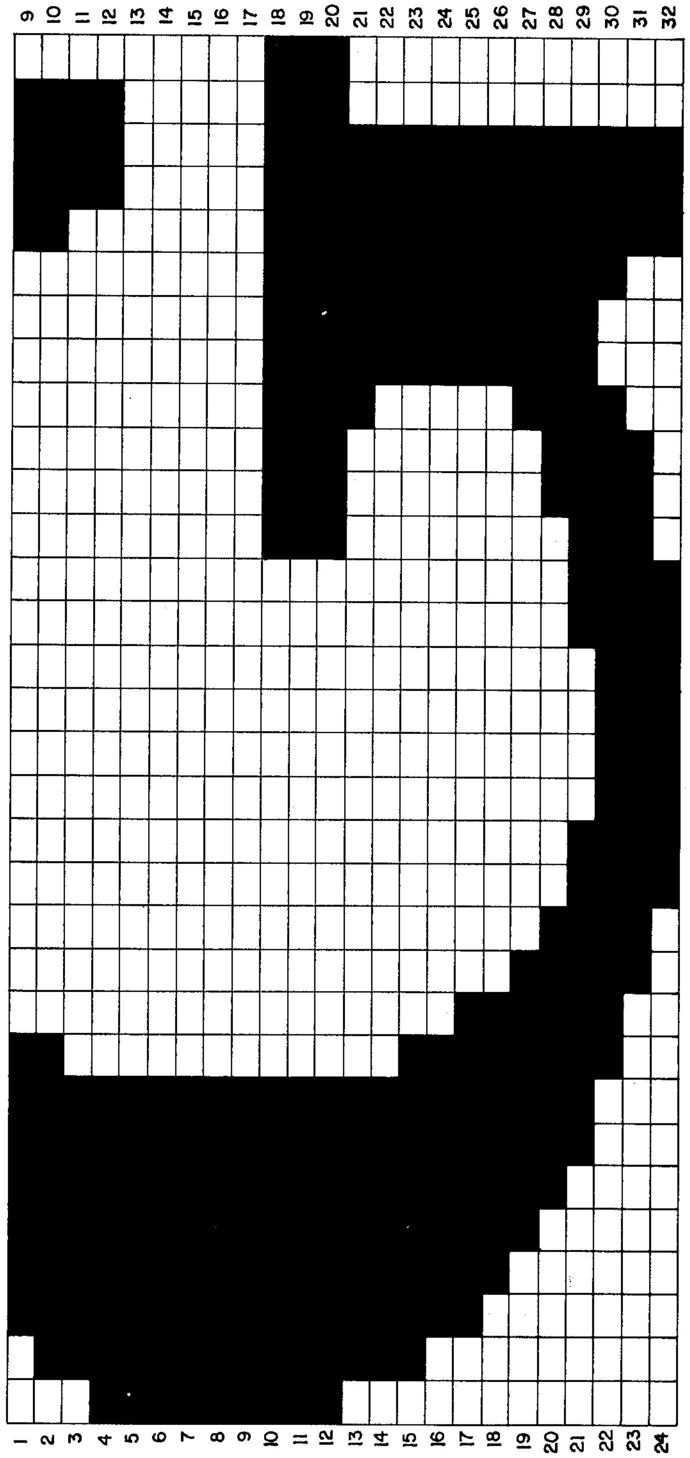

FIG. 7 illustrates what may be referred to as a top cropped "G" which can be displayed in accordance with selection on keyboard 10 of a 32 line height, a 4.4:4 aspect ratio (bold extended), a baseline of 24, and a bottom line of 24. For this example, the dot selection signal along line 102 would be "101" to select a clocking signal of 13.3 MHz. This relatively slow clocking frequency produces a relative wide character, as may be appreciated from FIG. 7. As with the other examples, the column of numbers to the left and right of the grid represent the ROM maps for the input scan line and segment height counter signals and scan control signals generated thereby, respectively.

The examples shown in FIGS. 2 through 7 were selected for ease in illustration and by way of example only. Clearly, many different heights, aspect ratios, baselines and bottom lines may be specified on keyboard 10 simply by providing the appropriate number of bit lines to receive the signals generated thereby, and by providing a sufficient number of differing oscillator rates to accommodate the selected heights and aspect ratios.

Obviously, numerous modifications and variations of the present invention are possible in light of the above teachings. It is therefore to be understood that within the scope of the appended claims, the invention may be practiced otherwise than as specifically described herein.

I claim:

1. A variable size character generator for use in a system that displays characters as matrices of dots, said system including a record medium, a modulated beam which impinges on said record medium, and means for generating a scanning raster so that said modulated beam is repetitively swept across said record medium at a substantially uniform rate, said means for generating comprising:

means for generating control signals for each character selected to be displayed, said control signals including a character address signal defining said selected character as a dot matrix having a fixed number of columns and lines, a height signal defining a selected height for said selected character, and an aspect ratio signal defining a selected aspect ratio for said selected character; and means for modulating said beam in accordance with said control signals for causing said selected character having said selected height and said selected aspect ratio to be displayed on said record medium, said means for modulating causing said selected character to be displayed as a dot matrix having a number of lines selected from said fixed number of lines to correspond to said selected height and said fixed number of columns spaced in accordance with an output rate established as a function of a width defined by said height signal and said aspect ratio signal.

2. The apparatus of claim 1, wherein said means for modulating includes:

means for generating scan control signals for said selected character in accordance with said height signal and said aspect ratio signal, said scan line control signals reflecting selected number of lines in said selected character to be displayed; and means for storing each of said characters as a dot matrix at a preselected character address, each dot matrix having a fixed number of lines, each of said lines having predetermined dot signals which are read out in response to said character address signal and said scan control signals.

3. The apparatus of claim 2, wherein said means for modulating further includes:

means for generating a dot rate selection signal for said selected character in accordance with said height signal and said aspect ratio signal, said dot rate selection signal representing a selected width of said character to be displayed as defined by said height signal and said aspect ratio signal;

means for generating a clocking signal whose frequency is selected in accordance with said dot rate selection signal; and register means for storing said predetermined dot signals of each line of a dot matrix to be displayed and for reading same out serially in accordance with the frequency of said clocking signal.

4. The apparatus of claim 1, wherein said means for modulating includes:

means for generating scan line counter signals for counting scan lines up to a predetermined segment height;

means for generating scan control signals for said selected character in accordance with said height signal, said aspect ratio signal and said scan line counter signals, said scan line control signals reflecting said selected number of lines in said selected character to be displayed; and means for storing each of said characters as a dot matrix at a preselected character address, each dot matrix having a fixed number of lines, each of said lines having predetermined dot signals which are read out in response to said character address signal and said scan control signals.

5. The apparatus of claim 1, further including:

means for generating width counter signals for counting horizontal segments up to a preselected width;

means for generating segment height counter signals for counting vertical segments up to a preselected height; and means for generating scan line counter signals for counting scan lines up to a predetermined segment height.

6. The apparatus of claim 5, wherein said means for modulating includes:

means for generating scan control signals for said selected character in accordance with said height signal, said aspect ratio signal, said segment height counter signals, and said scan line counter signals, said scan line control signals reflecting said selected number of lines in said selected character to be displayed; and means for storing each of said characters as a dot matrix at a preselected character address, each dot matrix having a fixed number of lines, each of said lines having predetermined dot signals which are read out in response to said character address signal and said scan control signals.

7. The apparatus of claim 1, wherein said control signals further include a bottom line signal defining a selected bottom line for each row of selected characters, said bottom line signal being provided to said means for modulating for defining a reference line for each of said selected characters on said row.

8. The apparatus of claim 7, wherein said control signals further include a baseline signal defining a selected baseline for said selected character, said baseline signal being provided to said means for modulating for causing said selected character having said selected height and said selected aspect ratio to be displayed on said record medium in accordance with said baseline signal.

9. The apparatus of claim 8, wherein said means for modulating includes:

means for generating scan control signals for said selected character in accordance with said height signal, said aspect ratio signal, said bottom line signal and said baseline signal, said scan line control signals reflecting said selected number of lines in said selected character to be displayed; and means for storing each of said characters as a dot matrix at a preselected character address, each dot matrix having a fixed number of lines, each of said lines having predetermined dot signals which are read out in response to said character address signal and said scan control signals.

10. The apparatus of claim 8, wherein said means for modulating includes:

means for generating scan line counter signals for counting scan lines up to a predetermined segment height;

means for generating width counter signals for counting horizontal segments up to a preselected width;

means for generating segment height counter signals for counting vertical segments up to a preselected height;

means for generating scan control signals for said selected character in accordance with said height signal, said aspect ratio signal, said baseline signal, said bottom line signal, said scan line counter signals, said width counter signals, and said segment height counter signals, said scan line control signals reflecting said selected number of lines in said selected character to be displayed;

means for storing each of said characters as a dot matrix at a preselected character address, each dot matrix having a fixed number of lines, each of said lines having predetermined dot signals which are read out in parallel in response to said character address signal and said scan control signals;

means for generating a dot rate selection signal for said selected character in accordance with said height signal and said aspect ratio signal, said dot rate selection signal representing a selected width of said character to be displayed as defined by said height signal and said aspect ratio signal;

means for generating a clocking signal whose frequency is selected in accordance with said dot rate selection signal; and register means for storing said predetermined dot signals of each line of a dot matrix to be displayed and for outputting same serially in accordance with the frequency of said clocking signal.

11. The apparatus of claim 10, further including means for generating segment clocking signals whose frequency is preselected to equal substantially the frequency of said modulated beam across one of said segments of said record medium.

12. The apparatus of claim 11, further including:

means for generating a clock count output signal in response to a predetermined number of said clocking signals, the count of said predetermined number of said clocking signals being reinitialized in response to a load signal at a reset input; and means for generating a load signal upon receipt thereby of said segment clocking signal and said clock count output signal, said load signal being provided to said reset input.

13. The apparatus of claim 12, wherein said means for storing said dot signals receives said dot signals from said storing means in response to said load signal.

14. The apparatus of claim 13, wherein said register means for generating said scan control signals further includes means for generating a blanking signal in accordance with said height signal, said aspect ratio signal, said baseline signal, said bottom line signal, said scan line counter signals and said segment counter signals, said blanking signal being fed to said means for generating said load signal for inhibiting the output thereof.

15. The apparatus of claim 10, wherein said means for generating a clocking signal includes:

oscillator divider chain means for providing a plurality of oscillator signals, the frequency of each of said oscillator signals being preselected; and dot rate selector means responsive to said plurality of oscillator signals for providing one of said oscillator signals as said clocking signal in accordance with said dot rate selection signal.

16. The apparatus of claim 10, wherein said means for storing each of said characters as a dot matrix comprises a read-only memory.

17. The apparatus of claim 10, wherein said means for generating scan control signals comprises a read-only memory.

18. The apparatus of claim 1, wherein said means for generating control signals receives and stores asynchronously user commands indicating said selected character having said selected height and said selected aspect ratio.

19. A variable size character generator used with a system that displays characters as matrices of dots on a screen of a cathode ray tube by modulating a beam of said cathode ray tube, said variable size character generator comprising:

means for generating width counter signals for counting horizontal segments up to a preselected width;

means for generating segment height counter signals for counting vertical segments up to a preselected height;

means for generating scan line counter signals for counting scan lines up to a predetermined segment height;

means for receiving and storing asynchronously user commands specifying a selected character having a selected height and a selected aspect ratio, said means for receiving and storing responsive to said width counter signals and said segment height counter signals for outputting onto an address bus a character address signal specified by said selected character and for outputting onto a character convertor bus a height signal specified by said selected height and an aspect ratio signal specified by said selected aspect ratio;

character conversion means for generating scan line signals in response to said scan line counter signals, said segment height counter signals, said height signal and said aspect ratio signal, said scan line control signals reflecting a selected number of lines in a matrix of dots for said selected character to result in a display of said selected character as a matrix of dots having a height defined by said height signal; and memory means for outputting to a first output a dot matrix stored at a location addressable by said character address signal and said scan line signals, said dot matrix having a fixed number of lines and each of said lines having predetermined dot signals therein, said scan line signals indicating which of said lines is to be outputted to said first output to result in a display of said addressed character as a matrix of dots having a number of lines corresponding to said height signal specified, said scan line signals selectively specifying a plurality of lines for said dot matrix of said character selected corresponding to said fixed number of lines and a plurality of combinations of lines less than said fixed number.

20. The variable size character generator of claim 19, further comprising:

means for generating a load signal;

gating means connected to receive and store the dot signals from said first output when said load signal is received by said gating means;

said gating means outputting serially to a character video output the stored dot signals at a rate determined by the frequency of a clocking signal, said rate being determinative of the width of the selected character to be displayed; and dot rate selector means for generating said clocking signal in accordance with a dot rate selection signal, said dot rate selection signal being generated by said character conversion means in response to said height signal, said aspect ratio signal and said resulting width defined thereby.

21. The variable size character generator of claim 20, wherein said character conversion means further provides a blanking signal for blanking the ouput of said gating means in accordance with said scan line counter signals, said segment height counter signals, said height signal and said aspect ratio signal.

22. The variable size character generator of claim 21, further comprising means for generating a segment divider signal for counting a predetermined number of segments per scan line.

23. The variable size character generator of claim 22, wherein said means for generating said load signal comprises:

means for counting said clocking signal and for providing a clock count output signal when a preselected number of said clocking signals are counted; and gate means for providing said load signal upon receipt thereby of said clock count output signal, said segment divider signal, and no blanking signal.

24. The variable size character generator of claim 23, wherein said character conversion means provides said scan line signals to said memory means in response to said scan line counter signals, said segment height counter signals, said height signal and said aspect ratio signal for causing certain ones of said lines of said dot matrix to be outputted from said memory means to produce a display of said selected character having said selected height.

25. The variable size character generator of claim 19, wherein said means for receiving and storing further receives and stores asynchronously user commands specifying a selected bottom line and a selected baseline, said means for receiving and storing further generating a bottom line signal specified by said selected bottom line and a baseline signal specified by said selected baseline signal, said bottom line signal and said baseline signal each being provided to said character conversion means for defining a bottom line for each line of displayed characters and a baseline for each of said selected characters displayed on each said line.

26. In a system for displaying characters as matrices of dots on a record medium, a method of varying the display size of a selected character, comprising the steps of:

establishing a height signal and an aspect ratio signal in accordance with a selected height user command and a selected aspect ratio user command, respectively;

generating scan control signals in accordance with said height signal and said aspect ratio signal;

determining selected lines of dot signals from a fixed dot matrix of said selected character having a predetermined number of lines of dot signals from a preselected character address of storage means in accordance with said scan control signals and as a function of said height signal;

developing a dot rate selection signal for defining a width of said selected character in accordance with a selected width as defined by said height signal and said aspect ratio signal;

supplying a clocking signal whose frequency is selected in response to said dot rate selection signal; and reading out only said selected lines of dot signals from said fixed dot matrix of said selected character at a rate corresponding to said clocking signal to display said selected character in accordance with the height and width defined by said selected height and aspect ratio user commands.

27. The method of claim 26, further comprising the step of setting a selected position of said selected character on the character display line in response to a baseline signal.

28. The method of claim 27, wherein said step of setting a selected position comprises the steps of:

generating said baseline signal in accordance with a selected baseline user command;

generating said scan control signals additionally in accordance with said baseline signal; and determining selected lines of dot signals from said fixed dot matrix of said selected character additionally as a function of said baseline signals.

29. The method of claim 28, wherein said step of setting a selected position further comprises the step of selecting a bottom line as a reference line for a row of characters to be displayed.

30. The method of claim 29, wherein said step of selecting said bottom line comprises the step of generating a bottom line signal in accordance with a selected bottom line user command, said step of generating scan control signals also being in accordance with said bottom line signal.

* * * * *